US009325787B2

(12) United States Patent
Tian et al.

(10) Patent No.: US 9,325,787 B2
(45) Date of Patent: Apr. 26, 2016

(54) LIMITED BROADCAST, PEERING AMONG DHTS, BROADCAST PUT OF LIMITED CONTENT ONLY

(75) Inventors: Jining Tian, Cupertino, CA (US); Jan Medved, Pleasanton, CA (US); Bruce Stuart Davie, Cambridge, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 499 days.

(21) Appl. No.: 12/467,737

(22) Filed: May 18, 2009

(65) Prior Publication Data

US 2010/0293295 A1 Nov. 18, 2010

(51) Int. Cl.
G06F 15/173 (2006.01)
H04L 29/08 (2006.01)
H04L 12/721 (2013.01)

(52) U.S. Cl.
CPC .......... *H04L 67/104* (2013.01); *H04L 67/107* (2013.01); *H04L 67/1091* (2013.01); *H04L 45/32* (2013.01); *H04L 67/1065* (2013.01)

(58) Field of Classification Search
CPC ......... H04L 45/18; H04L 45/32; H04L 45/16; H04L 45/20; H04L 45/7453; H04L 12/5689; H04L 61/2069; H04L 12/18; H04L 49/201
USPC ................................................. 709/223, 242
See application file for complete search history.

(56) References Cited

U.S. PATENT DOCUMENTS

| 2003/0110296 | A1  | 6/2003  | Kirsch et al. |
| 2004/0064693 | A1  | 4/2004  | Pabla et al. |
| 2004/0085329 | A1* | 5/2004  | Xu et al. ........................ 345/629 |
| 2004/0088646 | A1* | 5/2004  | Yeager et al. .................. 715/500 |
| 2004/0249970 | A1  | 12/2004 | Castro et al. |
| 2005/0004916 | A1* | 1/2005  | Miller et al. .................... 707/10 |
| 2006/0168304 | A1  | 7/2006  | Bauer et al. |
| 2006/0239275 | A1  | 10/2006 | Zlateff et al. |
| 2006/0259597 | A1* | 11/2006 | Jiang et al. ..................... 709/222 |
| 2007/0011267 | A1* | 1/2007  | Overton et al. ................. 709/217 |
| 2007/0172067 | A1  | 7/2007  | Otal et al. |
| 2007/0230482 | A1  | 10/2007 | Shim et al. |

(Continued)

FOREIGN PATENT DOCUMENTS

| CN | 102037711 A | 4/2011 |
| CN | 102037712 A | 4/2011 |

(Continued)

OTHER PUBLICATIONS

"Chord: A Scalable Peer-to-peer Lookup Service for Internet Applications", Ion Stoica et al. MIT Laboratory for Computer Science. http://pdos.lcs.mit.edu/chord/. SIGCOMM'01, Aug. 27-31, 2001, San Diego, CA.

(Continued)

*Primary Examiner* — Tom Y Chang

(74) *Attorney, Agent, or Firm* — Patent Capital Group

(57) ABSTRACT

In system of networks that are not fully meshed with each other and that are capable of processing distributed hash table (DHT) Put and Get messages, message flooding of GET messages is limited by maintaining a list of DHTs the GET has visited. Also, PUT messages include not only the storage location key in the home network but also a list of networks that the PUT has visited, in essence establishing a dynamically changing path within the PUT back to the home network.

18 Claims, 2 Drawing Sheets

(56) References Cited

U.S. PATENT DOCUMENTS

| | | | |
|---|---|---|---|
| 2007/0237152 A1* | 10/2007 | Zhu | 370/392 |
| 2008/0008178 A1 | 1/2008 | Tychon et al. | |
| 2008/0016240 A1 | 1/2008 | Balandin | |
| 2008/0177873 A1 | 7/2008 | Ni et al. | |
| 2008/0181219 A1 | 7/2008 | Chen et al. | |
| 2008/0225852 A1 | 9/2008 | Raszuk et al. | |
| 2008/0244067 A1 | 10/2008 | Ushiyama | |
| 2009/0016524 A1 | 1/2009 | Park et al. | |
| 2009/0083390 A1 | 3/2009 | Abu-Ghazaleh et al. | |
| 2009/0092124 A1 | 4/2009 | Singhal et al. | |
| 2009/0234917 A1 | 9/2009 | Despotovic et al. | |
| 2010/0064008 A1 | 3/2010 | Yan et al. | |
| 2010/0131564 A1 | 5/2010 | Pettovello | |
| 2010/0162035 A1 | 6/2010 | Rancurel | |
| 2010/0172270 A1 | 7/2010 | Smith et al. | |
| 2010/0226374 A1 | 9/2010 | Davie et al. | |
| 2010/0228798 A1 | 9/2010 | Kodama et al. | |
| 2010/0293223 A1 | 11/2010 | Bhardwaj | |
| 2011/0047084 A1* | 2/2011 | Manzalini et al. | 705/301 |

FOREIGN PATENT DOCUMENTS

| | | |
|---|---|---|
| CN | 201037712 A | 4/2011 |
| DE | 10 2006 021591 B3 | 4/2007 |
| EP | 2 034 665 A1 | 3/2009 |
| WO | WO 2005/079020 A1 | 8/2005 |
| WO | WO 2008/110054 A1 | 9/2008 |
| WO | PCT/US2010/035126 | 5/2010 |
| WO | WO 2010/135251 | 11/2010 |
| WO | WO 2010/135254 | 11/2010 |

OTHER PUBLICATIONS

"Peering Peer-to-Peer Providers", H. Balakrishnan et al. IPTPS, Feb. 2005.

Ganesan, Prasanna et al, "YAPPERS: a peer-to-peer lookup service over arbitrary topology," Proceedings IEEE Infocom 2003, The Conference on Computer Communications, 22$^{nd}$ Annual Joint Conference of the IEEE Computer and Communications Societies, San Francisco, CA, Mar. 30-Apr. 3, 2003; Proceedings IEEE InfoCom, The Conference on Compu, vol. Conf. 22, Mar. 30, 2003, pp. 1250-1260, XP002310321.

PCT Notification of Transmittal (1 page) of the International Search Report (4 pages) and the Written Opinion of the International Searching Authority, or the Declaration (5 pages) mailed Aug. 17, 2010 for PCT/US2010/035126.

USPTO Jan. 12, 2011 Final Office Action from U.S. Appl. No. 12/396,721.

PRC Nov. 13, 2012 SIPO First Office Action from Chinese Application 201080001586.3; 13 pages.

USPTO Mar. 21, 2013 Non-Final Office Action from U.S. Appl. No. 12/467,849.

PRC Mar. 28, 2013 Response to SIPO First Office Action dated Nov. 13, 2012 from Chinese Application 201080001586.3; English translation of claims only.

PRC Jan. 23, 2013 SIPO First Office Action from Chinese Application 201080001587.8; 17 pages.

PRC Jun. 6, 2013 Response to SIPO First Office Action dated Jan. 23, 2013 from Chinese Application 201080001587.8.

USPTO Jun. 21, 2013 Response to Mar. 21, 2013 Non-Final Office Action from U.S. Appl. No. 12/467,849.

USPTO May 25, 2012 Notice of Allowance from U.S. Appl. No. 12/396,721.

PRC Jan. 8, 2013 SIPO Second Office Action from Chinese Application 201080001586.3; 11 pages.

USPTO Aug. 1, 2013 Final Office Action from U.S. Appl. No. 12/467,849.

USPTO Dec. 1, 2011 Response to Sep. 2, 2011 Non-Final Office Action from U.S. Appl. No. 12/396,721.

PCT Dec. 1, 2011 Notification and Transmittal of International Preliminary Report on Patentability from PCT/US2010/035126; 7 pages.

PCT Dec. 1, 2011 Notification and Transmittal of International Preliminary Report on Patentability from PCT/US2010/035131; 6 pages.

Juwei Shi et al., "A Hierarchical Peer-to-Peer SIP System for Heterogeneous Overlays Interworking," Global Telecommunications Conference 2007; GLOBECOM '07 IEEE, Piscataway, NJ, USA, Nov. 1, 2007, XP031195953 ISBN: 978-1-4244-1042-2, pp. 93-97.

PCT Notification of Transmittal (1 page) of the International Search Report (4 pages) and Written Opinion of the International Searching Authority (4 pages) mailed Aug. 19, 2010 for PCT/US2010/035131.

Stoica, Ian et al., "Chord: A Scalable Peer-to-Peer Lookup Service for Internet Applications," MIT Laboratory for Computer Science, SIGCOMM'01, Aug. 23-31, 2001, San Diego, CA http://pdos.ics.mit.edu/chord/.

USPTO Nov. 16, 2011 RCE Response to Aug. 16, 2011 Final Office Action from U.S. Appl. No. 12/467,849.

USPTO Apr. 1, 2011 Non-Final Office Action from U.S. Appl. No. 12/467,849.

USPTO Jul. 1, 2011 Response to Apr. 1, 2011 Nonfinal Office Action from U.S. Appl. No. 12/467,849.

USPTO Aug. 16, 2011 Final Office Action from U.S. Appl. No. 12/467,849.

USPTO Sep. 2, 2011 Non-Final Office Action from U.S. Appl. No. 12/396,721.

PRC Oct. 16, 2013 Response to SIPO Second Office Action dated Aug. 1, 2013 from Chinese Application 201080001586.3; 11 pages.

EPO Jul. 27, 2012 Response to EP Communication pursuant to Rules 161(1) and 162 EPC from European Application No. 10723450.2; 12 pages.

EPO Jul. 27, 2012 Response to EP Communication pursuant to Rules 161(1) and 162 EPC from European Application No. 10723854.5; 10 pages.

USPTO Jan. 17, 2012 Final Office Action from U.S. Appl. No. 12/396,721.

USPTO Apr. 16, 2012 Request for Continued Examination Response to Jan. 17, 2012 Final Office Action from U.S. Appl. No. 12/396,721.

PRC Sep. 4, 2013 SIPO Second Office Action from Chinese Application 201080001587.8; 18 pages.

PRC Feb. 27, 2014 SIPO Third Office Action from Chinese Application 201080001587.8; 10 pages.

* cited by examiner

Broadcast GET

Broadcast PUT

LIMITED BROADCAST, PEERING AMONG DHTS, BROADCAST PUT OF LIMITED CONTENT ONLY

FIELD OF THE INVENTION

The present application relates generally to peer-to-peer networks and more particularly to limiting broadcast flooding, peering among distributed hash tables (DHT), and limiting content of broadcast storage messages such as PUTs.

BACKGROUND OF THE INVENTION

A peer-to-peer network is an example of a network (of a limited number of peer devices) that is overlaid on another network, in this case, the Internet. In such networks it is often the case that a piece of content or a service desired by one of the peers can be provided by more than one other node in the overlay network.

Distributed hash tables (DHTs) are a class of decentralized distributed systems that provide a lookup service similar to a hash table: (name, value) pairs are stored in the DHT, and any participating node can efficiently retrieve the value associated with a given name. Responsibility for maintaining the mapping from names to values is distributed among the nodes, in such a way that a change in the set of participants causes a minimal amount of disruption. This advantageously allows DHTs to scale to extremely large numbers of nodes and to handle continual node arrivals, departures, and failures. DHTs form an infrastructure that can be used to build more complex services, such as distributed file systems, peer-to-peer file sharing and content distribution systems, cooperative web caching, multicast, anycast, domain name services, and instant messaging.

BRIEF DESCRIPTION OF THE DRAWINGS

The details of the present disclosure, both as to its structure and operation, can best be understood in reference to the accompanying drawings, in which like reference numerals refer to like parts, and in which.

DESCRIPTION OF EXAMPLE EMBODIMENTS

Overview

Figure 1:
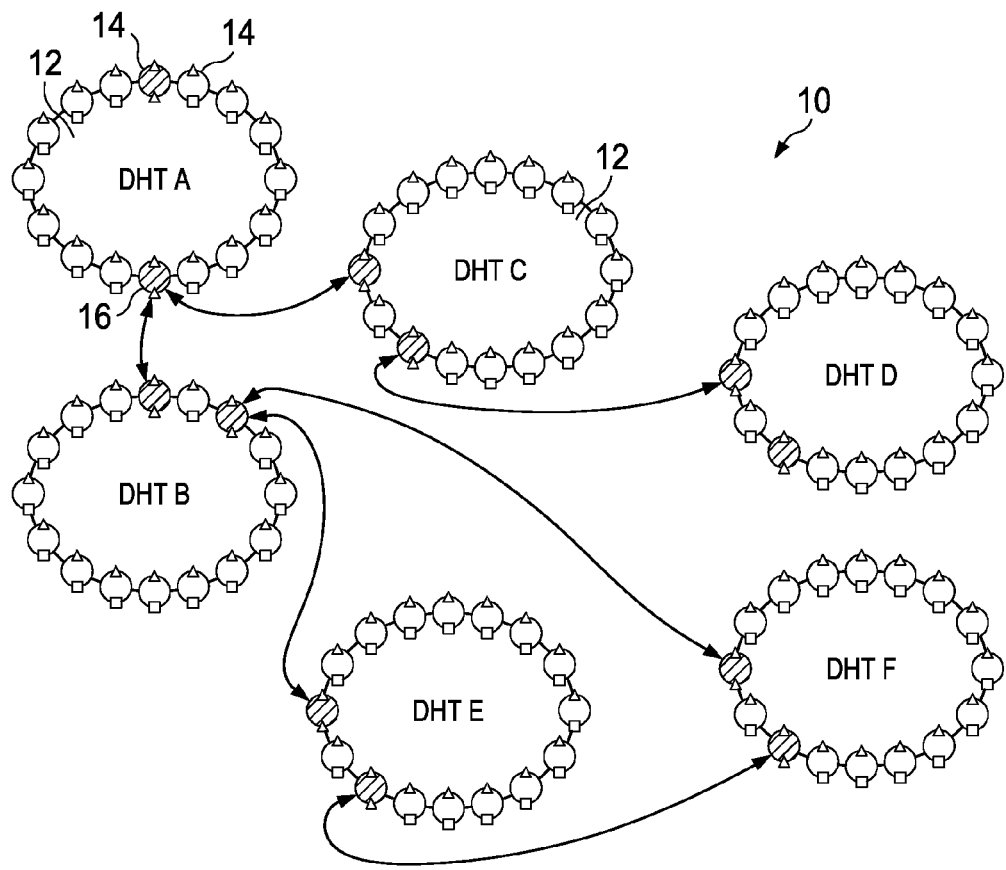
FIG. 1 is a block diagram of an example system in accordance with present principles.

As understood herein, peering among DHTs (e.g., peering among service providers implementing DHTs, as opposed to peering among individual clients within a single service provider's domain) can be achieved by broadcasting Put and Get messages (respectively, messages seeking to place data and messages seeking to obtain data) among the peered DHTs. If all DHTs are directly connected to all other DHTs then broadcasting is straightforward, but as understood herein, if the relationship between peering DHTs is more topologically complex so that some DHTs do not connect directly to other DHTs (as is the case with peering among multiple service providers), then flooding Put and Get messages is potentially expensive.

Techniques for flooding of messages in link-state routing protocols are not readily transferable to DHT peering. First, the overhead of flooding Puts and Gets, which are expected to be broadcast frequently, is of greater concern in DHT peering than are the relatively infrequent updates performed by routing protocols. Second, message passing among networks as envisioned herein differs from route advertisement because the gateways do not retain state about previously seen messages, rendering transferring flooding solutions from the route advertisement problem to the problem of passing messages between networks problematic.

Present principles are directed to alleviate one or more of the above drawbacks.

Accordingly, an apparatus includes a processor in a first network in a system of networks. The networks in the system are not fully meshed with each other. A computer readable storage medium bears instructions to cause the processor to receive a distributed hash table (DHT) data transfer message from a sending network and to forward the message on to other networks while implementing a flood-limiting measure. If the message is a PUT message, the PUT message contains a data storage key location, a data storage entity identification identifying an entity storing content associated with the PUT, and a network path back to the data storage entity.

When the data transfer message is a DHT Put or Get message, the flood-limiting measure may include appending to a "visited" list in a received Put or Get message an identification of a receiving network prior to forwarding the message on to other networks, and not forwarding the message on to networks appearing in the "visited" list of the message. Alternatively or in addition the flood-limiting measure may include not forwarding the message on if a hop count in the message exceeds a threshold. When the message is a DHT Put message, the flood-limiting measure may include not generating a PUT at the data storage entity when the content is updated.

In another embodiment a tangible computer readable medium bears instructions executable by a computer processor in a subject network for generating a PUT message when content is stored in the subject network but not when the content subsequently is updated. The PUT message includes a data storage location key in the subject network and a path to the subject network. The instructions include sending the PUT message to at least one other network.

In example implementations of this embodiment the subject network is a network in a system of networks that are not fully meshed with each other. That is, at least a first DHT does not directly communicate with a second DHT but does indirectly communicate with the second DHT through a third DHT. In such an environment, it may be necessary to keep track of the set of networks through which a Put or Get message has passed by recording this information in Put and Get messages as they pass from one network to another. When the networks are established by distributed hash tables (DHT), the medium may be implemented in a gateway component of the DHT.

In yet another embodiment a computer-implemented method includes receiving, at a component in a subject network, from a sending network in a system of networks that is not fully meshed, a distributed hash table (DHT) data transfer message. If the message is a Put or GET message, the instructions includes adding an identification of the subject network to a list of visited networks in the message and forwarding the message only to other networks with which the subject network directly communicates that are not on the list of visited networks. Also, if the message is a GET message and the subject network stores content that is subject of the GET message, the instructions includes sending the content to a requesting network using the list of visited networks. If, on the other hand, the message is a PUT message, the instructions include adding to the PUT message an identification of a network receiving the PUT message such that a PUT message contains a dynamically changeable network path from a receiving network to a network storing content associated with the PUT message. In other words, whenever a Put or Get message visits a sequence of networks, a path is recorded that points back to the network of origination, and this path is recorded in the message itself so that when the path changes information is contained in the message as to how to retrace the path back to the origination.

Example Embodiments

The following acronyms and definitions are used herein:

Autonomous DHT (AD): a DHT operated independently of other DHTs, with the nodes in the AD serving the entire DHT-ID keyspace.

Peering Gateway: a designated node in a DHT which has Internet Protocol (IP) connectivity to one or more Peering Gateways in other ADs and which forwards Puts, Gets, and the responses to Gets between the local DHT and the peer(s).

Origin or Home DHT: The DHT in which a piece of content is originally stored, which is the authoritative source for the content.

Present principles apply to one or more usage scenarios. For example, in one scenario multiple Autonomous DHTs (AD) are provided within a single provider. Each AD may be run by a different organization. These ADs may or may not reside in different autonomous systems in the routing sense. Each AD has access to the complete DHT-ID space, but may or may not store content that is stored in other ADs. It is desirable in this case that content located in one AD can be selectively accessed from another. There are many variants of this scenario, such as a provider having one AD that hosts the provider's content and a number of ADs that serve different regions or different classes of customer (such as mobile, DSL, etc).

Another usage scenario is peering among providers, in which service providers who operate DHTs may wish to peer with each other. This scenario differs from the preceding case mainly in the fact that a high degree of co-operation or trust among competing providers cannot be assumed. Thus, this scenario requires an appropriate level of isolation and policy control between providers. Variants of this scenario include providers whose main function is to host content, who then peer with providers whose main function is to connect customers to the content. Other variants may include providers who provide connectivity between small providers and "backbone" providers.

In any of the above usage scenarios the graph of providers should not be assumed to have any particular structure:

Accordingly and turning now to FIG. 1, a system 10 of networks 12 is organized into a loose hierarchy that may be expected to develop among peering content providers. A strict hierarchy would be one with only a single root among the networks 12 and with every network being the child of at most one parent network. Such a strict hierarchy should not be assumed because such an assumption is too restrictive as a practical matter. Each network 12 may establish a distributed hash table (DHT).

As shown, each network 12 can be composed of respective plural DHT storage nodes 14 as shown. Each network 12 may be a DHT per se or may be another DHT-like entity in the sense that it supports the Put/Get interface of a DHT even though it may be implemented in some other way internally. In one example embodiment each network can serve PUTS and GETS of any key in the full DHT keyspace.

Each network 12 includes a respective gateway node 16, discussed further below, that communicates with one or more gateway nodes of other networks 12. Thus, not all storage nodes 14 communicate with the other networks; rather, only the gateway nodes 16 of the various networks 12 communicate with other networks. Typically, a gateway 16 executes the logic below, although nodes 14 in a network 12 may execute all or part of the logic on behalf of network if desired.

In the example embodiment shown in FIG. 1, the networks 12 are labelled with the letters "A"-"F", and FIG. 1 illustrates that a strict top-down hierarchy among networks 12 may not be implemented. Instead, as shown network "A" communicates directly with networks "B" and "C" and with no other networks, whereas network "B" communicates directly with networks "A", "E", and "F". Networks "E" and "F" communicate with each other directly.

Network "C", in addition to communicating with network "A" directly as described above, communicates directly with only one other network, namely, network "D", which communicates directly with only one other network, "C".

Thus, it may now be appreciated that peering among DHTs may be selective, just as peering among Internet service providers is selective. Thus, the graph of peering relationships among DHTs is arbitrary and not a full mesh, in that not every DHT communicates directly with every other DHT in the system 10, although all DHTs in the system may communicate with each other indirectly through other DHTs.

Figure 2:
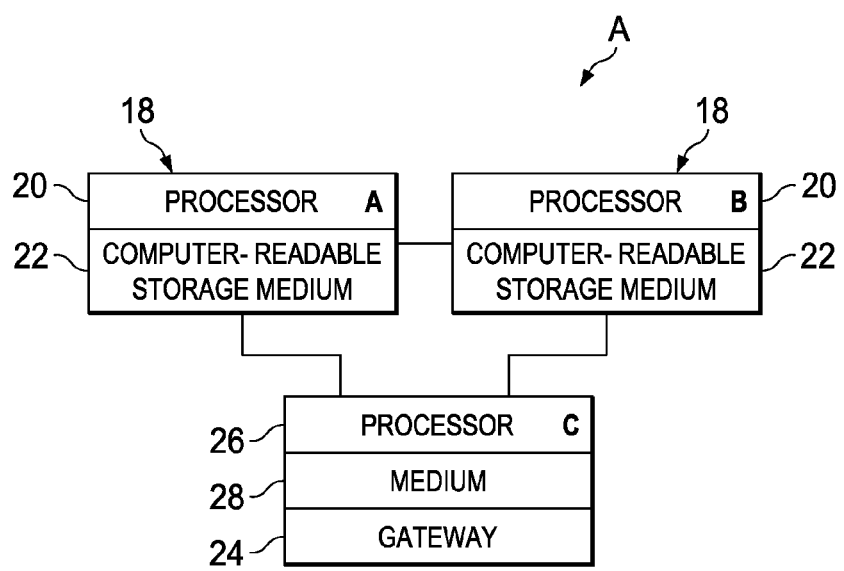
FIG. 2 is a block diagram of a part of the system shown in FIG. 1.

FIG. 2 shows a simplified view of a network, in this case, the network A from FIG. 1. As shown, a network may include plural members 18 (such as one of the above-described DHT storage nodes 14), each typically with one or more processors 20 accessing one or more computer-readable storage media 22 such as but not limited to solid state storage and disk storage. Typically, a network also includes at least one respective gateway 24 (such as the above-described gateway node 16) with its own processor 26 and computer readable storage media 28 that may embody present logic for execution thereof by the processor 26. Other parts of the logic may be implemented by one or more other members of the network. Network members 18 may include, without limitation, end user client devices, Internet servers, routers, switches, etc.

Figure 3:
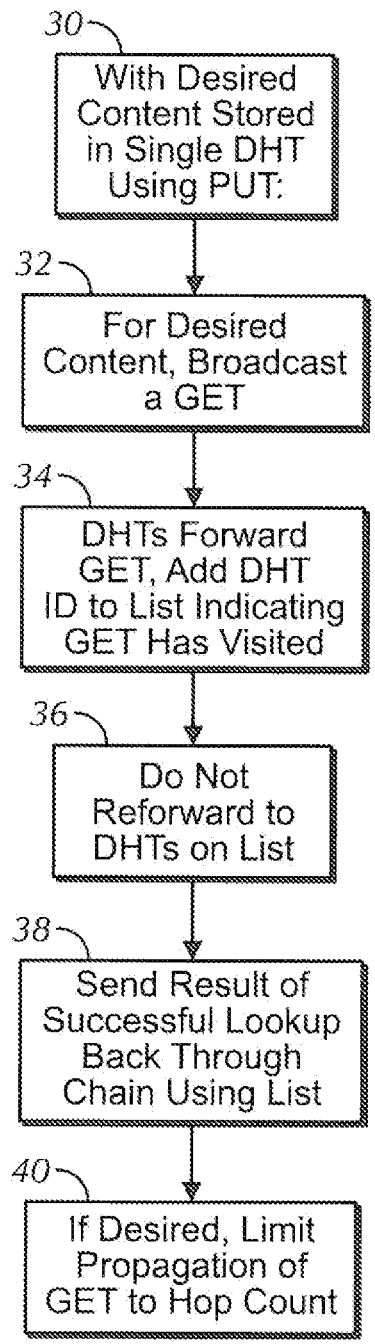
FIG. 3 is a flow chart of example logic for forwarding Get messages.

FIG. 3 illustrates example "GET" message logic. As an initial matter, data is stored at block 30 in a DHT by performing a PUT (key, value) operation; the value is stored at a location, typically in one and only one DHT, that is indicated by the fixed length key field of the PUT message. Data is retrieved using a GET (key) operation, which returns the value stored at the location indicated by the key field in the GET message. In example embodiments a single, flat keyspace is common to all DHTs, and all DHTs can PUT and GET values indexed by keys in that keyspace.

When a piece of content or other data stored at block 30 is desired, a GET message is broadcast at block 32 by the node desiring the content. A GET broadcast in one of the networks 12 must be flooded to all networks with which the requesting network has a peering relationship; those networks must flood it to their peers; and so on until all networks 12 have been contacted.

As understood herein, it is desirable to limit the scope of flooding and the amount of messaging. Accordingly, at block 34, each flooded GET message is augmented by networks 12 that receive it to contain a list of the DHTs/networks which have already been visited. It may be assumed that a naming convention is implemented by which each DHT/network can be uniquely identified. Once a message reaches a DHT/network for a second time, e.g., at block 36, it is not re-forwarded to DHTs on the list contained in the GET message.

Furthermore, by keeping this list of visited DHT/networks as an ordered list, a feasible path back to the requesting DHT is established. For example, if a GET message is flooded from network A to network B to network F in FIG. 1, and the lookup of the key is successful in network F, then the result of the lookup is sent back to network B at block 38 and then to network A and then returned to the node 18 in the network that requested the original GET operation.

If desired, at block 40 a hop count may be used in broadcast messages to limit their propagation. That is, each time a GET message visits a network a hop count field in the GET message is incremented by one, and when the hop count meets a threshold, the network at which the threshold is met does not forward the GET message any further.

Figure 4:
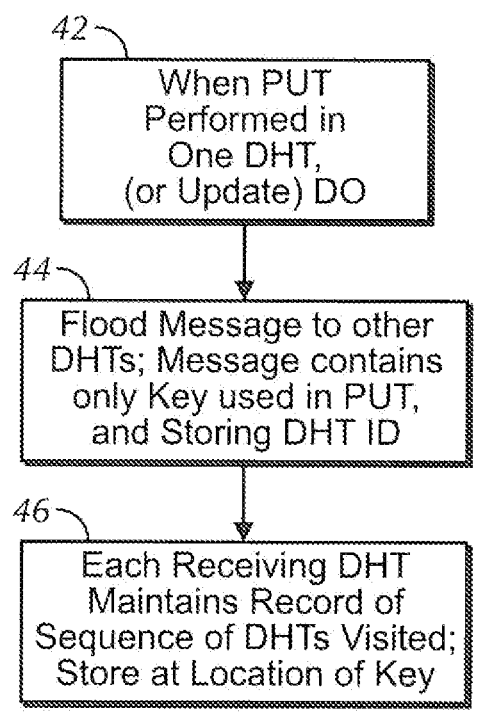
FIG. 4 is a flow chart of example logic for forwarding Put messages.

FIG. 4 illustrates example broadcast PUT logic that may be used for, e.g., popular content. At block 42, when a PUT operation is performed in one DHT/network, it is flooded to all the other networks at block 44. As indicated in block 44, however, only a pointer back to the storing network is included in the PUT. That is, the Put message conveys the identity of the network in which content is stored, but not the content itself. This obviates the need to broadcast a new broadcast PUT every time the content is updated, while at the same time removing the need for a broadcast GET. A GET in any DHT other than the DHT in which the content was stored can be forwarded directly to the "home DHT" where the content is stored, rather than being broadcast.

For example, if a new piece of content is stored in network A of FIG. 1, then a message is flooded to all other networks. This message contains the key used in the original PUT, and an identifier for the network A. As the message reaches each new network at block 46, a record is kept of the sequence of networks visited, and in each network the sequence record (but not the content itself, which is only stored in a single network) is stored at the corresponding location in the receiving network indicated by the key from the storing network, and the name of a visited network is added to the PUT prior to forwarding it on. For example, a PUT performed in network A at location "k" is forwarded to network B and stored at location "k" in network B. The PUT is then forwarded on to network F, which maintains a record pointing back to network A via network B at location "k" in network F. Thus, in addition to the "name" of the DHT ("home DHT") that stores the content, a path to get back to that DHT is stored, such that PUT messages have a format of Put(Key, value, path) and Get(Key, path), with peering gateways 16 implementing operations on the path to (a) prevent looping (b) forward a Get back to the appropriate DHT to obtain the content.

As a result, all networks learn how to obtain a particular piece of content, even though the content is only stored in a single "home" network. Updates to the content are performed in the home network without notifying any other networks.

In addition to the above, present principles envision, in some example embodiments, that the forwarding of PUT and GET messages among networks can be influenced by policy. For example, when a piece of content is stored in a given DHT, a policy may be as simple as "don't make this available to any other DHTs" or "only make this content available to DHT B".

It may now be appreciated that a flooding mechanism for PUTS and GETS among DHTs is provided so that content published in one DHT can be retrieved in another DHT. It should be further appreciated that present principles do not require full mesh connectivity among DHTs, and furthermore that selective publication of content to select DHTs may be facilitated. A mechanism is also included for storing a pointer back to a home DHT of a piece of content as an optimization.

Advantageously, with the above-described example logic DHTs do not have to be fully meshed, and popular, frequently-updated content can be located without fully-broadcast GETS and without re-broadcasting PUTS when content is updated. Moreover, if desired policies to control the flow of content can be implemented by each DHT independently.

While the particular LIMITED BROADCAST, PEERING AMONG DHTs, BROADCAST PUT OF LIMITED CONTENT ONLY is herein shown and described in detail, it is to be understood that the subject matter which is encompassed by the present disclosure is limited only by the claims.

What is claimed is:

1. An apparatus, comprising:
   a processor, wherein the apparatus is configured for provisioning in a first network in a system of not fully meshed networks, the apparatus being configured to:
   receive a distributed hash table (DHT) data transfer message from a sending network, wherein the DHT data transfer message is a GET message and the GET message includes a GET path that points back to a network of origination for the GET message; and
   receive a second data transfer message, wherein the second data transfer message is a PUT message, wherein the PUT message includes a pointer identifying a home DHT where content is stored and not the content itself and a PUT path that points back to a network of origination for the PUT message, wherein an identification of a network receiving the PUT message is added to the PUT message such that the PUT message includes a changeable network path from a receiving network to a network where content associated with the PUT message is stored.

2. The apparatus of claim 1, wherein a flood-limiting measure includes not generating a PUT message when the content is updated.

3. The apparatus of claim 1, the apparatus being further configured to:
   implement at least one flood-limiting measure that includes appending an identification of a receiving network to the list of the networks that have previously received the GET message such that the GET message is not forwarded to visited networks of the list, wherein the received GET message is forwarded to networks that are not on the list.

4. The apparatus of claim 1, wherein the PUT message includes a dynamically changeable network path from a receiving network to a network storing content associated with the PUT message.

5. The apparatus of claim 1, wherein the GET message and PUT message are influenced by a sharing policy.

6. The apparatus of claim 3, wherein the flood-limiting measure includes not forwarding the GET message on if a hop count in the GET message exceeds a threshold.

7. A method comprising:
   receiving a distributed hash table (DHT) data transfer message from a sending network, wherein the DHT data transfer message is a GET message and the GET message includes a GET path that points back to a network of origination for the GET message; and
   receiving a second data transfer message, wherein the second data transfer message is a PUT message, wherein the PUT message includes a pointer identifying a home DHT where content is stored and not the content itself and a PUT path that points back to a network of origination for the PUT message, wherein an identification of a network receiving the PUT message is added to the PUT message such that the PUT message includes a changeable network path from a receiving network to a network where content associated with the PUT message is stored.

8. The method of claim 7, wherein a flood-limiting measure includes not generating a PUT message when the content is updated.

9. The method of claim 7, further comprising:
implement at least one flood-limiting measure that includes appending an identification of a receiving network to the list of the networks that have previously received the GET message such that the GET message is not forwarded to visited networks of the list, wherein the received GET message is forwarded to networks that are not on the list.

10. The method of claim 7, wherein the PUT message includes a dynamically changeable network path from a receiving network to a network that stores content associated with the PUT message.

11. The method of claim 9, wherein the flood-limiting measure includes not forwarding the GET message on if a hop count in the GET message exceeds a threshold.

12. A computer apparatus comprising:
a non-transitory medium bearing instructions executable by a processor for:
receiving, at a component in a subject network, from a sending network in a system of networks that is not fully meshed, a distributed hash table (DHT) data transfer message, wherein the DHT data transfer message is a GET message and the GET message includes a GET path that points back to a network of origination for the GET message; and receiving a second data transfer message, wherein the second data transfer message is a PUT message, wherein the PUT message includes a pointer identifying a home DHT where content is stored and not the content itself and a GET path that points back to a network of origination for the PUT message, wherein an identification of a network receiving the PUT message is added to the PUT message such that the PUT message includes a changeable network path from a receiving network to a network where content associated with the PUT message is stored.

13. The apparatus of claim 12, wherein the method is executed by a processor in a gateway component of a DHT.

14. The apparatus of claim 12, the instructions comprising not generating the PUT message when content is updated.

15. The apparatus of claim 12, the instructions comprising storing a path back to the content by storing a list of networks visited by the PUT message associated with the content in each DHT visited by the PUT message.

16. The apparatus of claim 15, the instructions comprising appending to a "visited" list in a received PUT message an identification of a receiving network prior to forwarding the received PUT message on to other networks.

17. The apparatus of claim 16, the instructions comprising not forwarding the PUT message on to networks appearing in the "visited" list of the PUT message.

18. The apparatus of claim 15, the instructions comprising not forwarding the PUT message if a hop count in the PUT message exceeds a threshold.

* * * * *